US008819584B2

(12) United States Patent
Numazaki (10) Patent No.: US 8,819,584 B2
(45) Date of Patent: Aug. 26, 2014

(54) INFORMATION PROCESSING APPARATUS AND IMAGE DISPLAY METHOD

(75) Inventor: Shunichi Numazaki, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 497 days.

(21) Appl. No.: 12/954,415

(22) Filed: Nov. 24, 2010

(65) Prior Publication Data

US 2011/0191713 A1     Aug. 4, 2011

(30) Foreign Application Priority Data

Jan. 29, 2010  (JP) .................................. 2010-019688

(51) Int. Cl.
*G06F 3/048*   (2013.01)
*G06F 3/033*   (2013.01)
*G06F 3/041*   (2006.01)
*G06F 3/042*   (2006.01)

(52) U.S. Cl.
USPC ........... 715/800; 715/764; 715/781; 715/815; 715/863; 345/173; 345/175

(58) Field of Classification Search
USPC .......... 715/781, 800, 764, 815, 863; 345/173, 345/175
See application file for complete search history.

(56) References Cited

U.S. PATENT DOCUMENTS

| | | | |
|---|---|---|---|
| 6,232,957 B1 * | 5/2001 | Hinckley ...................... 345/156 |
| 6,643,824 B1 | 11/2003 | Bates et al. | |
| 6,803,930 B1 * | 10/2004 | Simonson ...................... 715/784 |
| 7,489,306 B2 | 2/2009 | Kolmykov-Zotov et al. | |
| 2005/0166158 A1 | 7/2005 | Blanchard et al. | |
| 2006/0132460 A1 | 6/2006 | Kolmykov-Zotov et al. | |
| 2008/0184160 A1 * | 7/2008 | Chang et al. ................... 715/781 |
| 2009/0164936 A1 * | 6/2009 | Kawaguchi ................... 715/788 |

FOREIGN PATENT DOCUMENTS

| | | |
|---|---|---|
| JP | 2000-207089 | 7/2000 |
| JP | 2005-202954 | 7/2005 |
| JP | 2006-179006 | 7/2006 |
| JP | 2009-151500 | 7/2009 |

OTHER PUBLICATIONS

Notification of Reasons for Refusal mailed by the Japan Patent Office on Apr. 19, 2011 in corresponding Japanese patent app. No. 2010-019688 in 8 pages.
Notification of Reasons for Refusal mailed by the Japan Patent Office on Aug. 23, 2011 in corresponding Japanese patent app. No. 2010-019688 in 10 pages.

* cited by examiner

*Primary Examiner* — Boris Pesin
*Assistant Examiner* — Rinna Yi
(74) *Attorney, Agent, or Firm* — Knobbe, Martens, Olson & Bear LLP (57) ABSTRACT

In one embodiment, there is provided an information processing apparatus. The apparatus includes: a display on which a window is displayed; a touch screen on the display; a display controller configured to display an operation screen on the display such that the operation screen is superposed on the window, wherein the operation screen generates an operation command for operating the window, based on an input operation through the touch screen; and an operation execution module configured to execute the operation command for operating the window.

14 Claims, 6 Drawing Sheets

INFORMATION PROCESSING APPARATUS AND IMAGE DISPLAY METHOD

CROSS-REFERENCE TO RELATED APPLICATION

This application claims priority from Japanese Patent Application No. 2010-019688, filed on Jan. 29, 2010, the entire contents of which are hereby incorporated by reference.

BACKGROUND

1. Field

Embodiments described herein generally relate to an information processing apparatus and an image display method.

2. Description of the Related Art

Reduction in size of a display provided in an information processing apparatus such as a personal computer has recently advanced in accordance with reduction in size of the information processing apparatus. To display information of contents efficiently in a small-sized display, control icons displayed in another region than the region of contents are displayed so semitransparently as to be superposed on a window.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided an information processing apparatus. The apparatus includes: a display on which a window is displayed; a touch screen on the display; a display controller configured to display an operation screen on the display such that the operation screen is superposed on the window, wherein the operation screen generates an operation command for operating the window, based on an input operation through the touch screen; and an operation execution module configured to execute the operation command for operating the window.

Figure 1:
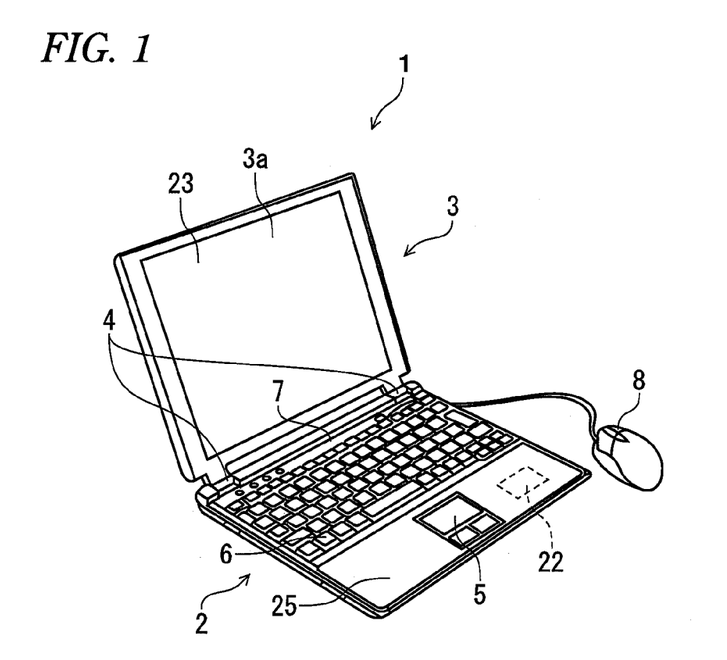
FIG. 1 is a perspective view showing the external appearance of a personal computer according to an embodiment of the invention.

An embodiment of the invention will be described blow with reference to FIGS. 1 to 6. The embodiment will be described in connection with the case where the invention is applied to a personal computer 1 which is one of information processing apparatuses. FIG. 1 is a perspective view showing the external appearance of a personal computer 1 according to an embodiment of the invention.

The personal computer 1 includes a computer body 2, and a display unit 3. A display screen 3a is incorporated in the display unit 3. In this embodiment, a touch screen 23 is laminated on a front surface of the display screen 3a. The display unit 3 is attached to hinges 4 so that the display unit 3 can be rotated freely between a close position where a top surface of the computer body 2 is covered with the display unit 3 and an open position where the top surface of the computer body 2 is exposed.

In this specification, a left side viewed from a user who uses the personal computer 1 while facing the display screen 3a in the open position is defined as "left", a right side viewed from the user is defined as "right", an upper side viewed from the user is defined as "upper", a lower side viewed from the user is defined as "lower", a front side viewed from the user is defined as "front", and a rear side viewed from the user is defined as "rear".

The computer body 2 has a housing shaped like a thin box. A keyboard 6 is provided in a central module of a top surface of the housing. A palm rest 25 is formed on a top surface of the housing module on the front side of the computer body 2. A touch pad 5 is provided substantially in the center of the palm rest 25. A communication module 22 is provided in the right side of the touch pad 5. A power switch 7 for powering on/off the computer body 2 is provided in the top surface of the housing module on the rear side of the computer body 2. The personal computer 1 according to this embodiment is configured so that a mouse 8 is connected as an input device to the personal computer 1 by a USB (Universal Serial Bus) or the like.

Figure 2:
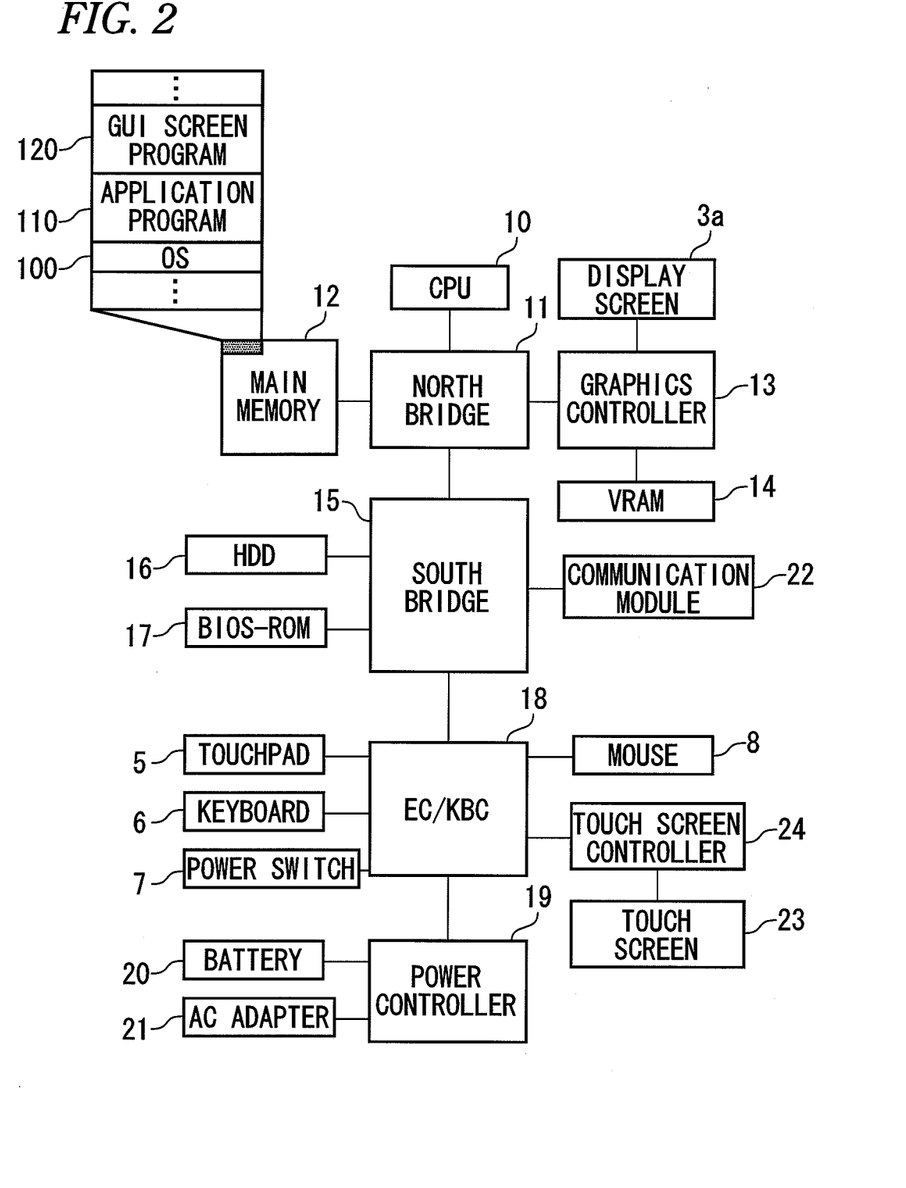
FIG. 2 is a functional block diagram of the personal computer according to the embodiment.

FIG. 2 is a functional block diagram of the personal computer according to the embodiment. The personal computer 1 includes a display screen 3a, a touch pad 5, a keyboard 6, a power switch 7, a mouse 8, a CPU (Central Processing Unit) 10, a north bridge 11, a main memory 12, a graphics controller 13, a VRAM (Video Random Access Memory) 14, a south bridge 15, an HDD (Hard Disk Drive) 16, a BIOS-ROM (Basic Input Output System Read Only Memory) 17, an EC/KBC (Embedded Controller/Keyboard Controller) 18, a power controller 19, a battery 20, an AC adapter 21, a commmunication module 22, a touch screen controller 24, and a touch screen 23.

The display screen 3a displays video based on a video signal given from the graphics controller 13.

The touch pad 5, the keyboard 6, the mouse 8 and the touch screen 23 are input devices which provide various operation signals to the personal computer 1 in accordance with user's operation.

The power switch 7 provides a control signal for powering on/off the personal computer 1 in accordance with user's operation.

The CPU 10 is a processor which is provided for controlling the operation of the personal computer 1 and which executes an operating system and various application programs loaded from the HDD 16 to the main memory 12. The CPU 10 further executes a system BIOS stored in the BIOS-ROM 17 after the system BIOS is loaded to the main memory 12. The system BIOS is a program for hardware control.

The north bridge 11 is a bridge device which connects a local bus of the CPU 10 and the south bridge 15 to each other. The north bridge 11 has a built-in memory controller which controls access to the main memory 12. The north bridge 11 further has a function of executing communication with the graphics controller 13 through an AGP (Accelerated Graphics Port) bus or the like.

The main memory 12 is a so-called working memory for expanding the operating system and various application programs stored in the HDD 16 and the system BIOS stored in the BIOS-ROM 17.

In this embodiment, an OS 100, an application program 110 and a GUI screen program 120 are expanded on the main memory 12. The function of the GUI screen program 120 according to the invention will be described later.

The graphics controller 13 is a display controller which controls the display screen 3a used as a display monitor of the computer. The graphics controller 13 generates a video signal for forming a display image to be displayed on the display 3a, from display data drawn on the VRAM 14 by the operating system/application program.

The south bridge 15 controls access to the BIOS-ROM 17 and controls disk drives (I/O devices) such as the HDD 16, an ODD (Optical Disk Drive), etc. In this embodiment, the communication module 22 for performing wireless communication with an external device is connected.

The HDD 16 is a storage device which stores the operating system, various application programs, etc.

The BIOS-ROM 17 is a rewritable nonvolatile memory which stores the system BIOS as a program for hardware control.

The EC/KBC 18 controls the touch pad 5, the keyboard 6, the mouse 8 and the touch screen 23 provided as input devices. The EC/KBC 18 is a one-chip microcomputer which monitors and controls various devices (peripheral devices, sensors, power supply circuits, etc.) regardless of the system state of the personal computer 1. The EC/KBC 18 further has a function of cooperating with the power controller 19 to power on/off the personal computer 1 in accordance with user's operation on the power switch 7.

When there is some external power source supplied through the AC adapter 21, the power controller 19 generates a system power source to be supplied to respective components of the personal computer 1 by using the external power source supplied through the AC adapter 21. On the other hand, when there is no external power source supplied through the AC adapter 21, the power controller 19 generates a system power source to be supplied to respective components (the computer body 2 and the display unit 3) of the personal computer 1 by using the battery 20.

The communication module 22 performs wireless communication with an external device. The communication module 22 includes a wireless antenna, a wireless communication circuit, etc.

The touch screen 23 is laminated on the front surface of the display screen 3a. The touch screen 23 is an input device which provides an operation signal corresponding to information displayed on the display screen 3a when the user touches the information through the touch screen 23.

The touch screen controller 24 detects a position touched with a user's finger on the touch screen 23 and provides a result of the detection to the EC/KBC 18. Incidentally, for example, a tablet (digitizer) capable of pointing a position with a pen and a tablet controller (digitizer controller) may be used in place of the touch screen 23 and the touch screen controller 24.

Figure 3:
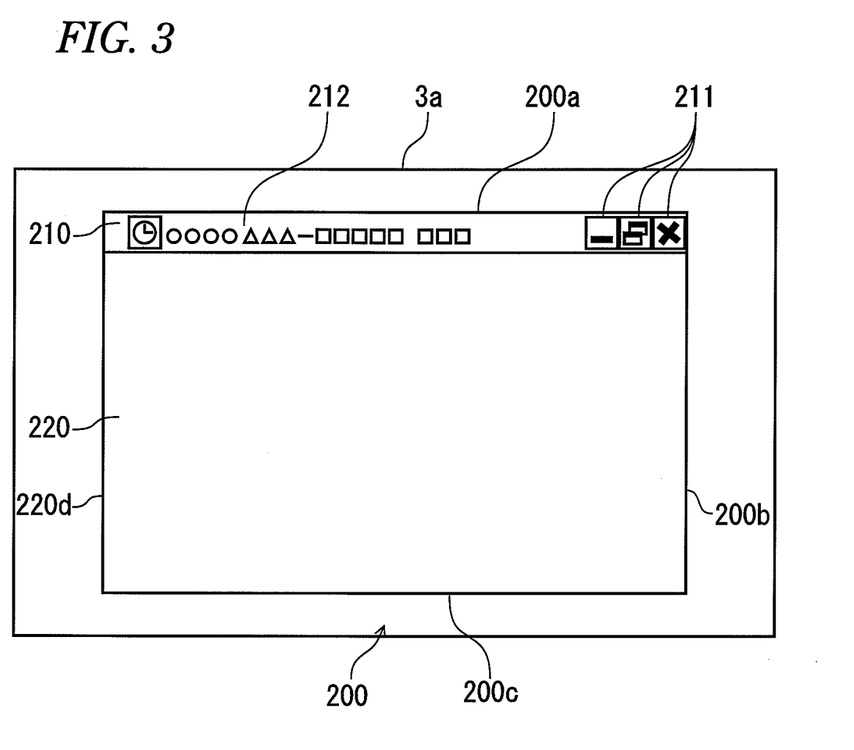
FIG. 3 is a view showing an example of a window in the embodiment.
Figure 4:
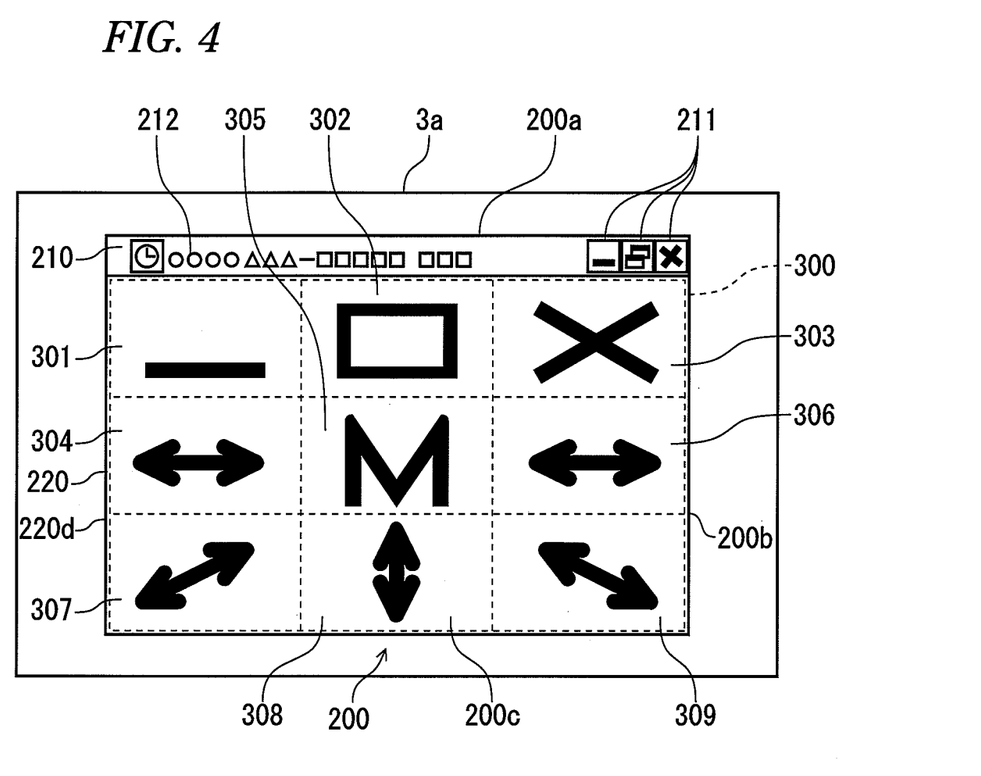
FIG. 4 is a view showing an example of a GUI screen in the embodiment.

The touch screen 23 is unsuitable for delicate input operation because the input operation through the touch screen 23 is performed by user's directly touching the touch screen 23 with the user's finger. Examples of the delicate input operation are an operation of selecting an icon displayed on a corner of a window 200 for changing the size of the window 200 and an operation of selecting a side or a vertex of the window 200 for resizing the window 200. That is, it is difficult to select a narrow region in the window 200 with a finger operation accurately, so that lowering of operating efficiency is brought. Therefore, in this embodiment, a GUI screen 300 assisting the input operation using the touch screen 23 is superposed on the window 200 in order to improve the handling property of the touch screen 23.

FIG. 3 is a view showing an example of the window 200 in this embodiment. The window 200 is a region surrounded by an upper side 200a, a right side 200b, a lower side 200c and a left side 200d. The window 200 includes a bar 210, and a working window 220. The bar 210 is an upper region of the window 200 along the upper side 200a. Icons 211 for changing the size of the window 200 and a file name 212 are displayed on the bar 210. The working window 220 is a region except the bar 210 in the window 200. The working window 220 is a region for displaying contents and working based on a started-up application program 110.

FIG. 4 is a view showing an example of the GUI screen 300 in this embodiment. Assume that the GUI screen 300 in this embodiment is partitioned into nine regions 301 to 309. A symbol indicating the contents of an operation executable in each partitioned region is displayed in the region. Because the GUI screen 300 composed of lines for partitioning the GUI screen 300 into regions and symbols indicating the contents of operations is displayed so semitransparently as to be superposed on the working window 220, the GUI screen 300 does not disturb user's visual recognition of display in the working window 220. Accordingly, in this embodiment, an operation of selecting an icon 211 by moving the cursor with the mouse 8 and an operation of selecting each region on the GUI screen 300 by touching the region with a user's finger through the touch screen 23 can be both executed.

The GUI screen 300 is displayed with a specific input operation as a trigger. When an operation is started on the GUI screen 300, the display of the GUI screen 300 is stopped. Although this embodiment shows the case where the specific input operation is an operation of touching the bar 210, the invention is not limited thereto. For example, the operation may be discriminated by the number of touching fingers or may be discriminated by the time of touching.

The contents of an operation in each region displayed in the GUI screen 300 will be described next. The GUI screen 300 is partitioned into a minimizing operation region 301, a maximizing operation region 302, a terminating operation region 303, a left resizing operation region 304, a menu displaying operation region 305, a right resizing operation region 306, a lower left resizing operation region 307, a vertical resizing operation region 308 and a lower right resizing operation region 309.

The minimizing operation region 301 minimizes the window 200. That is, only the file name 212 is displayed in a lower module of the display screen 3a.

When touching the maximizing operation region 302 is detected, the window 200 is maximized. That is, the window 200 is enlarged on the whole region of the display screen 3a.

When touching the terminating operation region 303 is detected, the window 200 is closed and any operation on the window 200 is terminated.

When touching the left resizing operation region 304 is detected, resizing is performed for expanding or shortening the window 200 leftward in accordance with the motion of a user's finger. That is, the window 200 is resized in such a manner that the left side 200d is moved while the right side 200b is fixed.

When touching the menu displaying operation region 305 is detected, the display of the GUI screen 300 is stopped and a menu concerned with resizing of the window 200 is displayed. The menu concerned with resizing is a menu of operations such as minimizing, maximizing, terminating, size restoring, etc. as represented by the icons 211.

When touching the right resizing operation region 306 is detected, resizing is performed for expanding or shortening the window 200 rightward in accordance with the motion of a user's finger. That is, the window 200 is resized in such a manner that the right side 200b is moved while the left side 200d is fixed.

When touching the lower left resizing operation region 307 is detected, resizing is performed for expanding or shortening the window 200 lower leftward in accordance with the motion of a user's finger. That is, the window 200 is resized with an intersection point of the upper side 200a and the right side 200b as a base point.

When touching the vertical resizing operation region 308 is detected, resizing is performed for expanding or shortening the window 200 downward in accordance with the motion of a user's finger. That is, the window 200 is resized in such a manner that the lower side 200c is moved while the upper side 200a is fixed.

When touching the lower right resizing operation region 309 is detected, resizing is performed for expanding or shortening the window 200 lower rightward in accordance with the motion of a user's finger. That is, the window 200 is resized with an intersection point of the upper side 200a and the left side 200d as a base point.

Although this embodiment has been described in connection with the case where the GUI screen 300 is partitioned into nine regions, the invention is not limited thereto. The number of partitioned regions and the contents of an operation corresponding to each region may be provided as another embodiment. For example, a region for resizing the window upward may be provided as a vertical resizing region or a region for changing the size of the window automatically may be provided.

Figure 5:
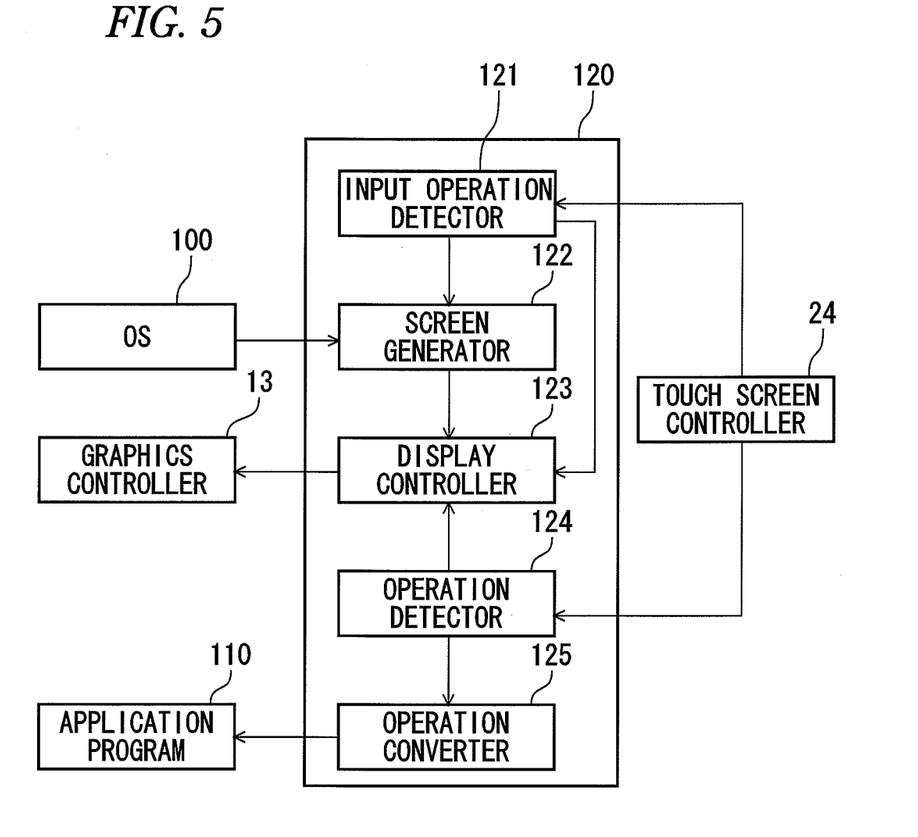
FIG. 5 is a functional block diagram of a GUI screen program in the embodiment.

The function of the GUI screen program 120 according to the invention will be described next. FIG. 5 is a functional block diagram of the GUI screen program 120 in this embodiment. The GUI screen program 120 includes an input operation detector 121, a screen generator 122, a display controller 123, an operation detector 124, and an operation converter 125. The functions of the respective functional blocks will be described.

The input operation detector 121 detects a specific input operation for displaying the GUI screen 300. In this embodiment, information of a position touched through the touch screen 23 is first received from the touch screen controller 24. Then, it is determined whether the touched position information is in the bar 210 of the window 200 or not. When the touched position information is in the bar 210, the input operation detector 121 sends a command indicating detection of the specific input operation to the screen generator 122.

When the input operation detector 121 detects touching in the bar 210 while the GUI screen 300 is displayed, the display of the GUI screen 300 is stopped. That is, a command indicating stopping the display of the GUI screen 300 is sent to the display controller 123. Incidentally, the input operation for stopping the display of the GUI screen 300 is not limited to touching in the bar 210 but may be an operation of a specific key in the keyboard 6.

Upon reception of a command indicating detection of a specific input operation from the input operation detector 121, the screen generator 122 acquires region information indicating the position and size of the working window 220 in the window 200 including the bar 210 from the OS 100 by referring to information of the position where touching is detected. Then, the screen generator 122 generates a video signal of the GUI screen 300 to be superposed on the working window 220 based on the region information. The screen generator 122 provides the generated video signal of the GUI screen 300 to the display controller 123.

The display controller 123 superposes the video signal of the GUI screen 300 generated by the screen generator 122 on the video signal of the window 200 and provides the superposed video signal to the graphics controller 13. The display controller 123 further switches display/non-display of the GUI screen 300 in accordance with the commands received from the input operation detector 121 and the operation detector 124.

The operation detector 124 detects whether an operation resizing the window 200 is performed on the GUI screen 300 through the touch screen 23 or not. That is, the operation detector 124 receives touched position information through the touch screen 23 from the touch screen controller 24, generates information of a position in the GUI screen 300, that is, information indicating which of the regions 301 to 309 is touched, and sends the information to the operation converter 125.

When no operation is executed on the GUI screen 300 for a predetermined time, the operation detector 124 sends a command to the display controller 123 to stop the display of the GUI screen 300.

The operation converter 125 converts the contents of the operation into a corresponding operation command based on the position information received from the operation detector 124, and sends the operation command to an application program 110 which has started up the window 200 displayed in the position designated by the position information. The application program 110 resizes the window 200 based on the received operation command for resizing the window 200.

As described above, the user's operation command indicating resizing on the GUI screen 300 is converted to a command corresponding to the application program 100 which has started up the window 200, by the function of each function block.

Figure 6:
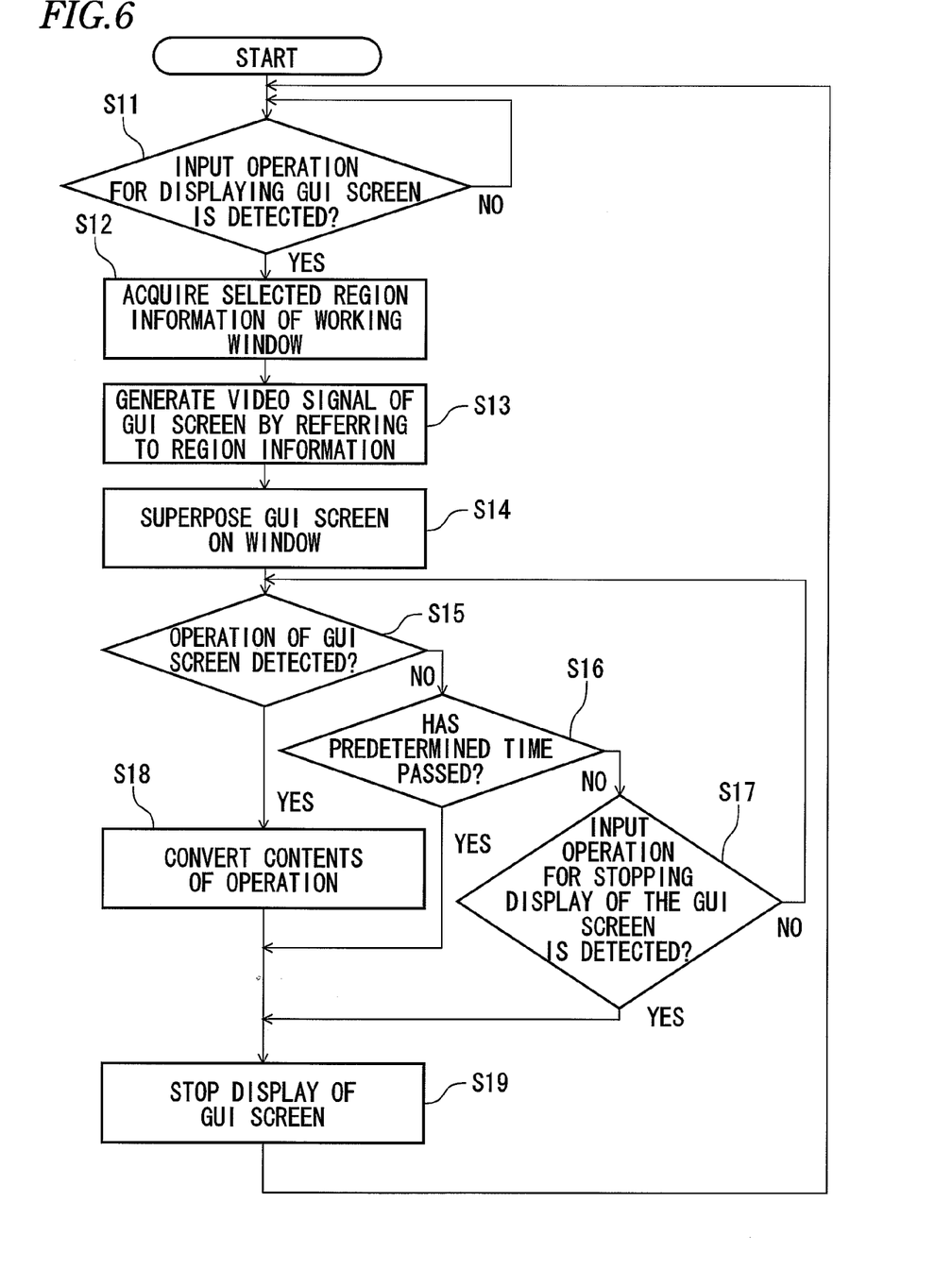
FIG. 6 is a flow chart showing a procedure of display control of the GUI screen in the embodiment.

A procedure executed by the GUI screen program 120 for resizing the window 200 will be described next. FIG. 6 is a flow chart showing a procedure of display control of the GUI screen 300 in this embodiment.

First of all, the input operation detector 121 determines whether an input operation for displaying the GUI screen 300 is detected or not (step S11). That is, in this embodiment, it is determined whether touching in the bar 210 is detected or not. When no input operation is detected (No in step S11), the step S11 is repeatedly performed.

On the other hand, when the input operation for displaying the GUI screen 300 is detected (Yes in step S11), the screen generator 122 receives selected region information of the working window 220 (step S12). That is, the screen generator 122 acquires region information of the working window 220 in the window 200 including the bar 210 from the OS 100 by referring to the information of the position where touching is detected.

Then, the screen generator 122 generates a video signal of the GUI screen 300 to be superposed on the working window 220 based on the region information of the working window 220 (step S13). Then, the display controller 123 superposes the generated video signal of the GUI screen 300 on the video signal of the window 200 and outputs the superposed video signal to the graphics controller 13 (step S14).

Then, the operation detector 124 determines whether an operation on the GUI screen 300 is detected or not (step S15). That is, the operation detector 124 determines whether the information of the position touched through the touch screen 23 and received from the touch screen controller 24 is in the GUI screen 300 or not.

When the operation is detected (Yes in step S15), the contents of the operation are converted (step S18). That is, the operation converter 125 converts the contents of the operation into a corresponding operation command based on the position information received from the operation detector 124, and sends the operation command to the started-up application program 110. The application program 110 resizes the window 200 based on the received operation command for resizing the window 200.

On the other hand, when no operation is detected (No in step S15), it is determined whether a predetermined time has passed or not (step S16). In this embodiment, the predetermined time is stored in the operation detector 124, and time measurement is performed based on a clock provided in the CPU 10.

When the predetermined time has not passed (No in step S16), the input operation detector 121 determines whether an input operation for stopping the display of the GUI screen 300 is detected or not (step S17). When the input operation for stopping the display of the GUI screen 300 is not detected (No in step S17), the process returns to the step S15. That is, the display of the GUI screen 300 is continued and it is determined whether an operation on the GUI screen 300 is detected or not.

On the other hand, when the input operation for stopping the display of the GUI screen 300 is detected (Yes in step S17), the display of the GUI screen 300 is stopped (step S19). That is, the input operation detector 121 stops the display of the GUI screen 300 when touching in the bar 210 is detected again while the GUI screen 300 is displayed.

On the other hand, when the predetermined time has passed (Yes in step S16), the display of the GUI screen 300 is stopped (step S19).

That is, when an operation on the GUI screen 300 is detected and resizing of the window 200 is started, or when no operation is executed on the GUI screen 300 for the predetermined time, or when touching in the bar 210 is detected within the predetermined time while the GUI screen 300 is displayed, the display of the GUI screen 300 is stopped. After the step S19, the process returns to the step S11 again so that the aforementioned steps are repeatedly performed.

As described above, in this embodiment, the GUI screen 300 for assisting the operation of the touch screen 23 is superposed on the window 200. Operations on the touch screen 23 are made to correspond to partitioned regions of the GUI screen 300, so that each operation of resizing the window 200 through the touch screen controller 24 can be performed in a wider range. For example, when an instruction to minimize the window 200 is to be input through the touch screen 23, it is necessary to click a small icon displayed on a corner of the window 200 but it is difficult to touch such a narrow place accurately. Moreover, when the window 200 is to be resized, it is also necessary to adjust the cursor on a side or vertex required for resizing the window 200 but an operation with a user's finger may be difficult. However, according to the embodiment, an operation with a user's finger can be performed on the GUI screen 300 displayed with the same size as that of the working window 220. Accordingly, it is possible to solve inconvenience in the aforementioned operation. That is, when an operation of minimizing the window 200 is allocated to one of partitioned regions of the GUI screen 300, the window 200 is minimized when the region is touched. Accordingly, an operation executable region can be enlarged greatly to thereby improve handling property compared with the case where one of icons provided in the window 200 is touched.

Incidentally, this embodiment may be modified. Although this embodiment has been described in connection with the case where the size of the GUI screen 300 is equal to that of the working window 220, the invention is not limited thereto. That is, handling property of the touch screen 23 can be improved as long as the size of the GUI screen 300 is larger than that of the icons 211 in the window 200.

Although description has been made in the case where the display of the GUI screen 300 is stopped when an operation on the GUI screen 300 is detected and resizing of the window 200 is started, or when no operation is executed on the GUI screen 300 for the predetermined time, the invention is not limited thereto. Because the GUI screen 300 does not disturb visual recognition of the window 200 as long as the GUI screen 300 is in a semitransparent state, resizing may be performed while the GUI screen 300 is displayed.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An information processing apparatus comprising:
a display comprising a touch screen and configured to display a window in the touch screen, wherein the window includes a first region of the window corresponding to a bar of the window and a second region of the window corresponding to a work region of the window;
a first display controller configured to display an icon configured to generate a window operation command for operating the window based on a first touch input detected in the first region of the window;
a second display controller configured to display a semitransparent window operation screen in an entire region of the second region of the window in response to a second touch input detected in the first region of the window such that the semitransparent window screen is superimposed on the entire region of the second region of the window, the second region being different from the first region, wherein the semitransparent window operation screen is configured to generate a plurality of window operation commands for operating the window based on a third touch input detected in the second region of the window, and the semitransparent window operation screen is partitioned into a plurality of regions, each corresponding to one of the window operation commands, and the size of each of the plurality of regions is larger than that of the icon displayed on the first region of the window; and
a window operation execution module configured to execute the window operation command for operating the window.

2. The apparatus of claim 1,
wherein the semitransparent window operation screen is configured to generate the window operation command for resizing the window, and wherein the window operation execution module is configured to send the window operation command for resizing the window, to an application starting up the window.

3. The apparatus of claim 1,
wherein the semitransparent window operation screen is configured to generate the window operation command for terminating an application starting up the window, and
wherein the window operation execution module is configured to send the window operation command to the application.

4. The apparatus of claim 1,
wherein the semitransparent window operation screen is configured to generate the window operation command for displaying a menu screen, wherein the menu screen indicates resizing the window or terminating an application starting up the window,
wherein the second display controller is configured to display the menu screen when the semitransparent window operation screen generates the window operation command, based on the input from the touch screen, and
wherein the window operation execution module is configured to send the window operation command to the application, based on a selected item from the menu screen.

5. The apparatus of claim 1, wherein the second display controller is configured to hide the semitransparent window operation screen after displaying the semitransparent window operation screen for a given time.

6. The apparatus of claim 5, wherein in receiving a window operation command for stopping the display of the semitransparent window operation screen while the semitransparent window operation screen is displayed, the second display controller hides the semitransparent window operation screen even before displaying the semitransparent window operation screen for the certain time.

7. The apparatus of claim 1, wherein the plurality of window operation commands of the semitransparent window operation screen include the window operation command of the icon of the first region of the window.

8. An image display method, comprising:
displaying a window in a region of a touch screen of a display, wherein the window includes a first region of the window corresponding to a bar of the window and a second region of the window corresponding to a work region of the window;
displaying an icon configured to generate a window operation command for operating the window based on a first touch input detected in the first region of the window;
displaying a semitransparent window operation screen in an entire region of the second region of the window in response to a second touch input detected in the first region of the window such that the semitransparent window operation screen in superimposed on the entire region of the second region of the window, the second region being different from the first region, wherein the semitransparent window operation screen is configured to generate a plurality of window operation commands for operating the window based on a third touch input detected in the second region of the window, and the semitransparent window operation screen is partitioned into a plurality of regions, each corresponding to one of the window operation commands, and the size of each of the plurality of regions is larger than that of the icon displayed on the first region of the window;
receiving a fourth touch input from the second region of the touch screen; and
executing the window operation commands of the semitransparent window operation screen based on the input from the second region.

9. The method of claim 8,
wherein the semitransparent window operation screen is configured to generate a window operation command for resizing the window, and
wherein the step of executing the window operation commands comprises sending the window operation command for resizing the window, to an application starting up the window.

10. The method of claim 8,
wherein the semitransparent window operation screen is configured to generate a window operation command for terminating an application starting up the window, and
wherein the step of executing the window operation commands comprises sending the window operation command to the application.

11. The method of claim 8,
wherein the semitransparent window operation screen is configured to generate a window operation command for displaying a menu screen, wherein the menu screen indicates resizing of the window or terminating of an application starting up the window,
wherein the step of displaying the semitransparent window operation screen comprises displaying the menu screen when the semitransparent window operation screen generates the window operation command, based on the input from the touch screen, and
wherein the step of executing the window operation commands comprises sending the window operation command to the application, based on an item selected from the menu screen.

12. The method of claim 8, wherein the semitransparent window operation screen is hidden after the semitransparent window operation screen is displayed for a certain time.

13. The method of claim 8, wherein in receiving a window operation command for stopping the display of the semitransparent window operation screen while the semitransparent window operation screen is displayed, the semitransparent window operation screen is hidden even before the semitransparent window operation screen is displayed for the certain time.

14. The method of claim 8, wherein the plurality of window operation commands of the semitransparent window operation screen include the window operation command of the icon of the first region of the window.

* * * * *